US012695009B2

(12) United States Patent (10) Patent No.: US 12,695,009 B2
Zalar et al. (45) Date of Patent: Jul. 28, 2026

(54) COMPOSITE THERMISTOR ELEMENT

(71) Applicant: Nederlandse Organisatie voor toegepast-natuurwetenschappelijk onderzoek TNO, 's-Gravenhage (NL)

(72) Inventors: Peter Zalar, Eindhoven (NL); Edsger Constant Pieter Smits, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 430 days.

(21) Appl. No.: 18/275,961

(22) PCT Filed: Jan. 24, 2022

(86) PCT No.: PCT/NL2022/050033
§ 371 (c)(1),
(2) Date: Aug. 4, 2023

(87) PCT Pub. No.: WO2022/173288
PCT Pub. Date: Aug. 18, 2022

(65) Prior Publication Data
US 2024/0304362 A1 Sep. 12, 2024

(30) Foreign Application Priority Data
Feb. 12, 2021 (EP) .................................... 21156840

(51) Int. Cl.
*H01C 7/02* (2006.01)
*G01K 7/22* (2006.01)
(Continued)

(52) U.S. Cl.
CPC .............. *H01C 7/02* (2013.01); *G01K 7/226* (2013.01); *H01C 1/1406* (2013.01); *H01C 1/1413* (2013.01); *H01C 7/04* (2013.01)

(58) Field of Classification Search
CPC ...... H01C 7/02; H01C 1/1406; H01C 1/1413; H01C 7/04; H01C 17/06586; H01C 7/049;
(Continued)

(56) References Cited

U.S. PATENT DOCUMENTS 6,114,413 A * 9/2000 Kang ........................ C08K 9/02
523/210
6,143,207 A * 11/2000 Yamada .............. C04B 35/6261
252/521.1
(Continued)

FOREIGN PATENT DOCUMENTS

JP 5497765 A 8/1979
JP S61212001 A 9/1986
(Continued)

OTHER PUBLICATIONS

DB Deutz, "Structure Property Relationships for NTC Ceramics (I) and Polymer Composites (II)," Master of Science Thesis, Delft University of Technology, Faculty of Aerospace Engineering (Mar. 8, 2013).
(Continued)

*Primary Examiner* — Kyung S Lee
(74) *Attorney, Agent, or Firm* — Leydig, Voit & Mayer, Ltd.

(57) ABSTRACT
A composite thermistor element is described. The element includes a sensor material that is disposed between a pair of electrodes. The sensor material includes particles in a dielectric matrix. Each of the particles have: a core having a temperature dependent resistance, and a cover layer of an inorganic material. The particles form an electron conducting pathway between the electrodes having a temperature dependent resistance and a base-line resistance. Further aspects relate to a method of manufacturing the thermistor, the coated particles, a composition for use in the manufac-
(Continued)

turing of composite thermistors that includes the particles, and to a temperature sensor including the thermistor described herein.

15 Claims, 6 Drawing Sheets

(51) Int. Cl.
H01C 1/14 (2006.01)
H01C 7/04 (2006.01)

(58) Field of Classification Search
CPC ............ H01C 17/06533; H01C 17/065; H01C 7/043; G01K 7/226
See application file for complete search history.

(56) References Cited

U.S. PATENT DOCUMENTS

| | | | | |
|---|---|---|---|---|
| 9,583,453 | B2 * | 2/2017 | Shearer | .................... H01L 24/27 |
| 10,278,284 | B2 * | 4/2019 | Campbell | ............... B29C 35/02 |
| 10,741,312 | B2 * | 8/2020 | Rentrop | ................. H01C 7/049 |
| 2008/0006796 | A1 | 1/2008 | Khatua et al. | |
| 2008/0023665 | A1 * | 1/2008 | Weiser | ................ H01L 23/3737 |
| | | | | 257/E23.107 |
| 2019/0009330 | A1 | 1/2019 | King et al. | |

FOREIGN PATENT DOCUMENTS

| | | |
|---|---|---|
| JP | S636503 B2 | 2/1988 |
| JP | 2002541675 A | 12/2002 |
| JP | 2015506579 A | 3/2015 |
| JP | 2017519349 A | 7/2017 |
| JP | 2020038084 A | 3/2020 |
| WO | WO 2018/164570 A1 | 9/2018 |

OTHER PUBLICATIONS

Antonio Feteira, "Negative Temperature Coefficient Resistance (NTCR) Ceramic Thermistors: An Industrial Perspective," J. Am. Ceram. Soc., 92 [5] 967-983 (2009).
Di Zhang et al., "Nanoengineering of Crystal and Amorphous Surfaces of Pharmaceutical Particles for Biomedical Applications," ACS Applied Bio Materials, 2019, 2, pp. 1518-1530.
Dimitra Katerinopoulou et al., "Large-Area All-Printed Temperature Sensing Surfaces Using Novel Composite Thermistor Materials," Advanced Electronic Materials, 2018, 1800605 pp. 1-7.
European Patent Office, International Search Report in corresponding International Application No. PCT/NL2022/050033, dated Apr. 4, 2022 (2 pages).

* cited by examiner

COMPOSITE THERMISTOR ELEMENT

CROSS-REFERENCE TO RELATED APPLICATIONS

This patent application is a U.S. National Phase of PCT International Application No. PCT/NL2022/050033, filed Jan. 24, 2022, which claims priority to European Application No. 21156840.7, filed Feb. 12, 2021, which are both expressly incorporated by reference in their entireties, including any references contained therein.

TECHNICAL FIELD AND BACKGROUND

The present disclosure relates to a composite thermistor element comprising particles dispersed in a matrix, its manufacture, a composition for manufacturing the sensor material, and to a temperature sensor comprising the composite thermistor element.

A thermistor is a type of resistor whose resistance has a particular dependence on temperature. When the dependence is known, the resistance can be used as a measure for the temperature. Typically, the ceramics contain mainly the oxides of transition elements like Mn, Zn, Fe, Co, Ni and Cu which are known for having a specific temperature coefficient of resistance.

Two principal routes are known for manufacturing a ceramic thermistor element. The first involves sintering a mixture of precursor materials to a pre-defined form, e.g., in a mould. After sintering the ceramic can be further machined into a final form, e.g. by sawing and/or mechanical milling. A second involves forming an element by deposition, e.g. sputtering or printing, a composition comprising thermo-resistive particles. WO2018164570 discloses a printed temperature sensor comprising a sensor material comprising semi-conducting micro-particles comprising a ceramic NTC material with a negative temperature coefficient. The sensor material is formed by mixing micro particles with a strong NTC behavior in a dielectric matrix composition, for example comprising a polymer, with a solvent to form the sensor material as an ink or paste. The ink or paste is hardened or cured by crosslinking the dielectric matrix and/or evaporating the solvent without melting or sintering the micro-particles.

Independent of the manufacturing route known thermistors the electric properties, e.g. conductivity, of the thermo-resistive material is controlled by controlling the composition, e.g. doping level, of the ceramic sensing material. In doing so, the temperature-dependent resistivity of the material can no longer be changed, which limits the applicability of a given bulk ceramic of ceramic particles to sensing applications with a given temperature range.

SUMMARY

The present invention aims to improve on the above by providing a method and materials that allow modulating the electrical properties of thermo-resistive ceramics.

Aspects of the present disclosure relate to a composite thermistor element. The composite thermistor element can be of particular use for determining a temperature by measuring an electrical resistance across the element. The element comprises a sensor material disposed between a pair of electrodes. The sensor material comprises particles dispersed in a matrix. The particles contacting each other to form an electron conducting pathway between the electrodes, e.g. along an interconnected network of contacting particles across the sensor material.

The particles have a core comprising a semiconducting ceramic material having temperature dependent resistance, e.g. a material specific temperature dependent coefficient of resistance. The particles have a cover layer of an inorganic material. The cover layer imposes and electrical resistance on to the particles. As such the resistive cover imposes an electrical resistance across the sensor material along the electron conducting pathway between the electrodes. The thickness and/or electrical properties, e.g. conductance, are in accordance with a predetermined baseline resistance across the sensor material. Typically the thickness of the cover layer is within a range that enables electron tunneling between cores of the contacting particles.

The contacting particles, e.g. the interconnected network, acts as a conductive pathway with temperature-dependent coefficient of conductivity between the electrodes. The particles including the cover can be understood to act as thermo-resistive particles having a temperature dependent coefficient of resistance. Depending on the composition of the core the coefficient can be negative (NTC) or positive (PTC). The matrix is non-conducting and acts as a binder for the particles. The matrix is formed of an electrically insulating composition, e.g. a dielectric, and is typically comprised of a polymer composition, typically crosslinked. The electrical resistance of the pathway was found to have a baseline resistance and a temperature dependent component that is believed to be dominated by the core of the particles. The baseline resistance was found to be dominated by the cover layer that acts as a barrier between adjacent ones of contacting particles.

Advantageously the baseline resistance imposed by the cover layer was found to have no significant effect on the coefficient of temperature dependent resistance of the particles and/or the thermistor. Providing the particles with a cover layer of an electrically resistive, semi conductive, or even insulating material advantageously allows to modulate the conductivity across the thermo-resistive particles without negatively affecting the temperature-dependent component. It was found that the baseline resistance can be effectively tuned by controlling the properties of the cover layer, including its thickness and/or composition (electrical resistance).

Controlling the baseline resistance advantageously allows selecting or tuning the semiconducting ceramic material so as to obtain a thermistor having desired electrical properties, including a specific temperature dependent coefficient of resistance ($\beta$) and an overall resistance that remains within a practical range of detection over a predetermined temperature window. In practice, the lower limit of the range of detection is typically defined by the electrical resistance of the electrode materials and/or electrical wiring. The upper limit is typically defined by the sensitivity of the readout circuitry. Typically, the sensor material comprised in the thermistor is designed to have a resistance in a range between about 10 times the resistance of the wiring and/or electrodes and about $10^{11}$ Ohm (about 10 gigaohm) within a given temperature range of operation. Typically the resistance is between 10 and 10 G$\Omega$. Preferably the resistance is above 100$\Omega$, more preferably above 1 k$\Omega$. Preferably the resistance is below 1 G$\Omega$, e.g. in a range between 100 ohm and 1 gigaohm. Having a resistance that close to a resistance of the electrical wiring, for example in case of an NTC material, decreases thermistor sensitivity at increasingly high temperatures. Having a too high resistance, e.g. for a PTC material at increasingly high temperatures increases readout noise.

Accordingly, the inorganic cover layer can be understood as imposing an essentially temperature independent baseline resistance component onto the temperature dependent component of the particles. The relative contribution of the baseline resistance to an overall resistance of the particles and the sensor material as a whole can be tuned by selecting a thickness and/or resistivity of the covering material. In this way the baseline resistance of the sensing material can be in accordance with a desired temperature regime essentially independently of varying the specific temperature dependent coefficient of the semi conductive ceramic material. This insulating layer effectively results in the formation of a tunneling barrier between semiconductive particles, raising the baseline resistance, while leaving the bulk conduction mechanism of the semi conductive particles unchanged.

It will be understood that the inorganic cover layer as disclosed herein can advantageously be a conformal layer encapsulating the core forming an essentially defect free shell. By providing a conformal insulating shell, preferably an essentially defect-free shell, direct electrical contact between thermosensitive cores of adjacent particles can be mitigated or even avoided.

Further aspects of the present disclosure relate to a method of manufacturing a composite thermistor as disclosed herein. The method comprises: providing a powder of a semiconducting ceramic having a temperature dependent resistance, typically selected with a with a known or target temperature dependent coefficient of resistance (B). The method further comprises coating the powder with an inorganic material to form particles having a core comprising the semiconducting ceramic and an resistive or insulating cover layer of the inorganic material. The method further comprises processing a composition comprising the coated particles and an electrically insulating matrix material or precursor thereto so as to form a sensor material between a pair of electrodes, the sensor material comprising the particles dispersed in the matrix, wherein the particles contact each other to form an electron conducting pathway between the electrodes. In a preferred embodiment, the thickness of the cover layer is provided in accordance with a predetermined baseline resistance across the sensor material.

In a preferred embodiment, processing the composition comprises disposing the composition between a pair of electrodes, e.g. prefabricated electrodes deposited on substrate, preferably a flexible substrate such as polymer film. Alternatively, one or more of the electrodes can be provided onto a processed layer of the composition.

Further aspects of the present disclosure relate to the particles as disclosed herein, i.e. the semiconducting core with an inorganic cover layer. Yet further aspects relate to a composition comprising the particles as disclosed herein. The particles and the composition can be of particular use for manufacturing the sensor material of a composite thermistor element as disclosed herein.

Even further aspects relate to a temperature sensor comprising thermistor element according to the invention.

BRIEF DESCRIPTION OF DRAWINGS

These and other features, aspects, and advantages of the apparatus, systems and methods of the present disclosure will become better understood from the following description, appended claims, and accompanying drawing wherein:

4

Figure 1A:
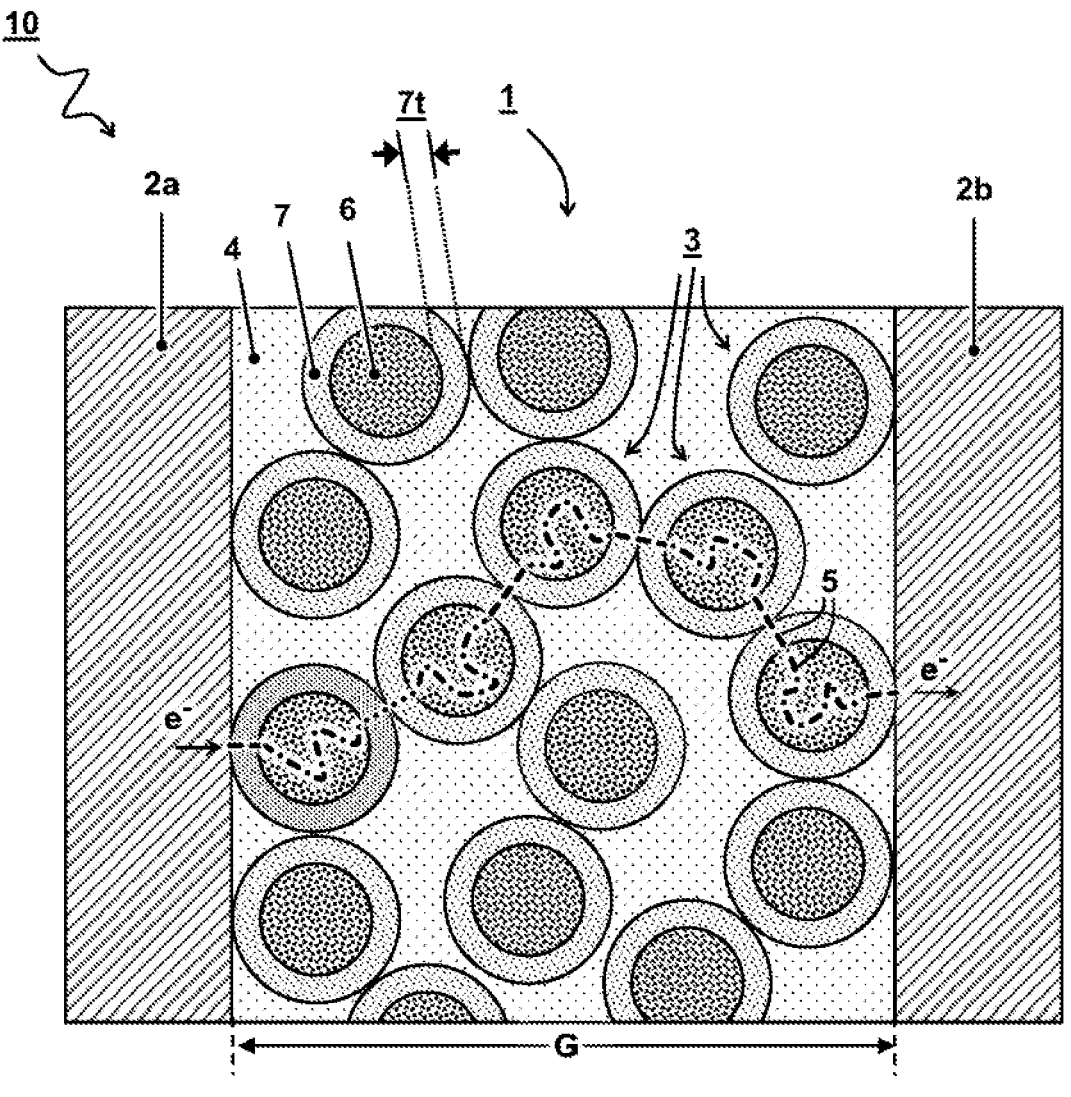
Figure 1B:
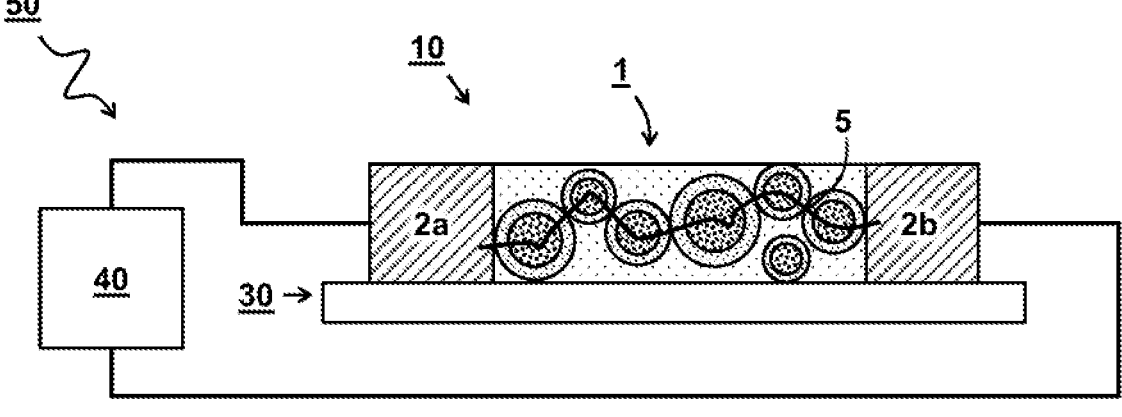
Figure 2A:
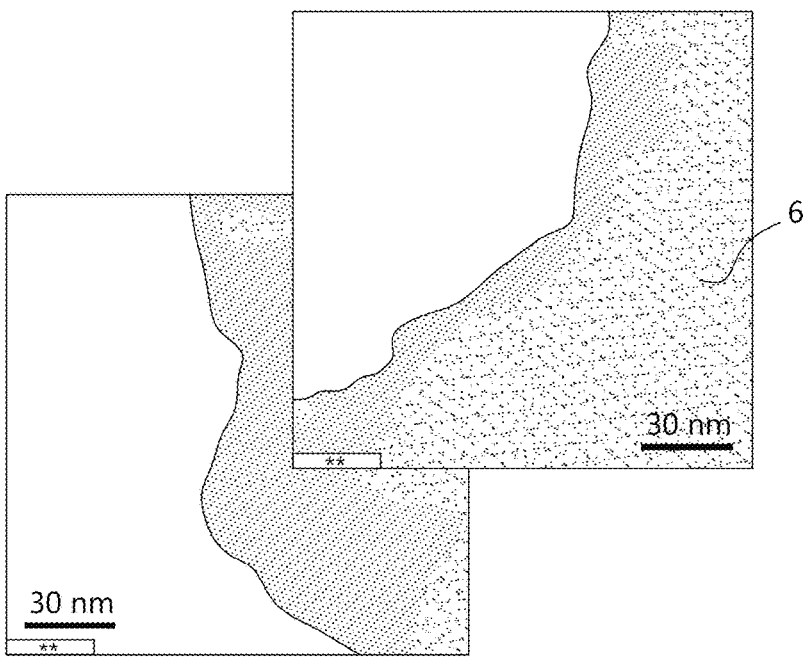
Figure 2B:
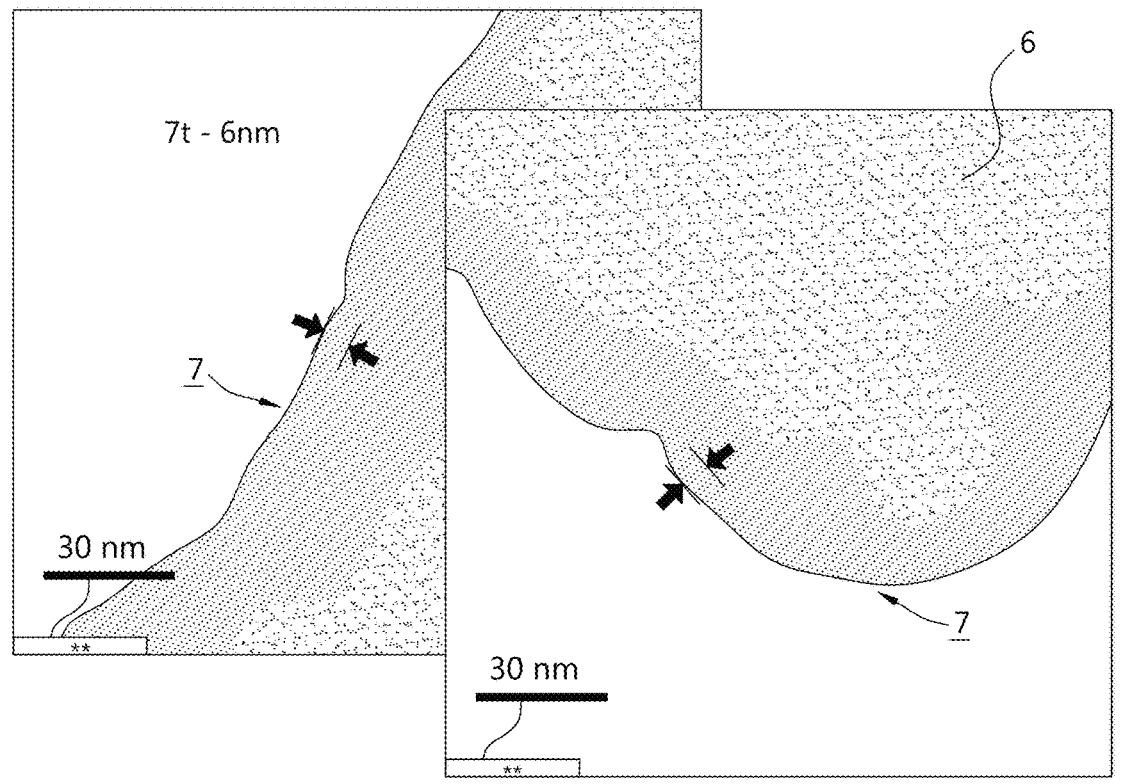
Figure 3A:
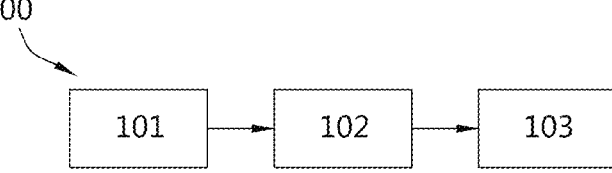
Figure 3B:
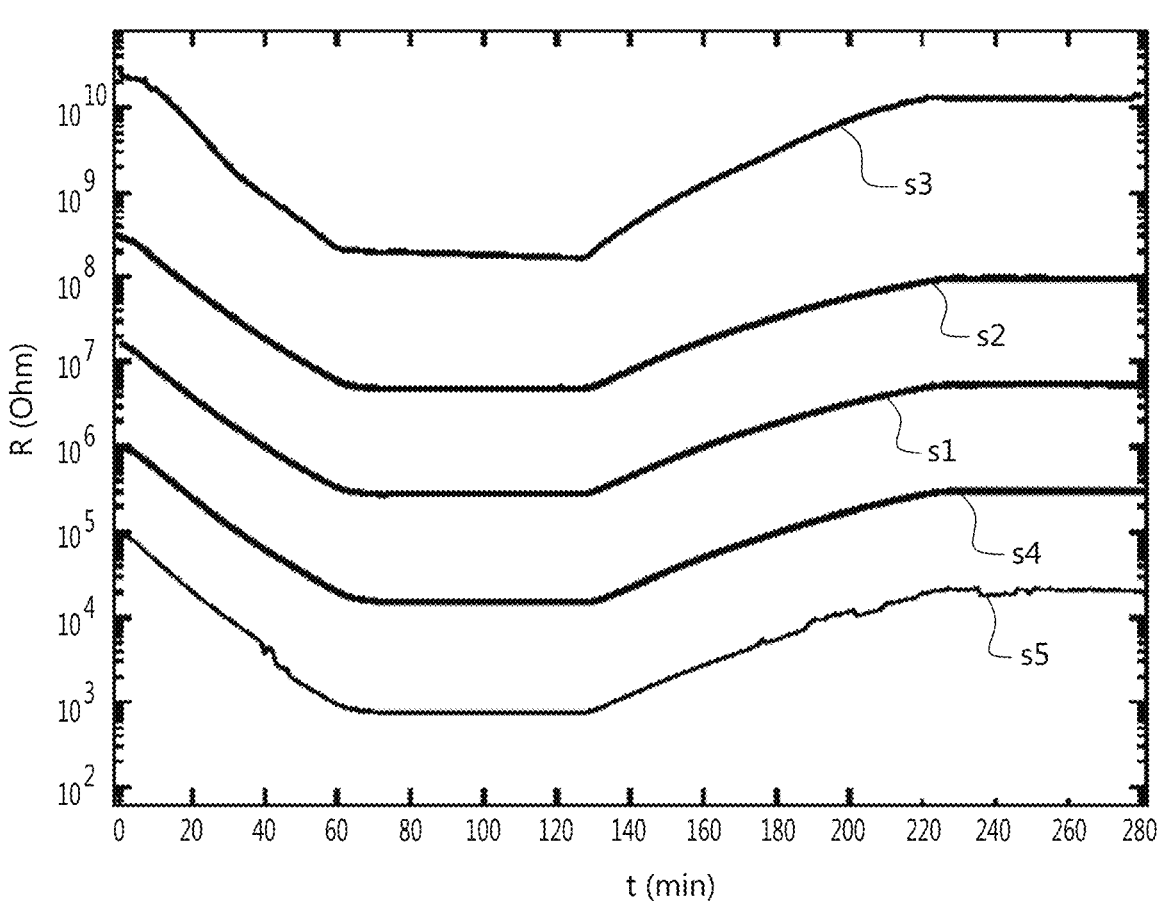
Figure 3C:
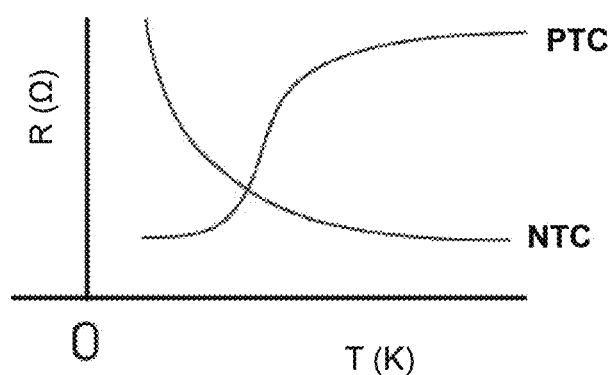
Figure 4:
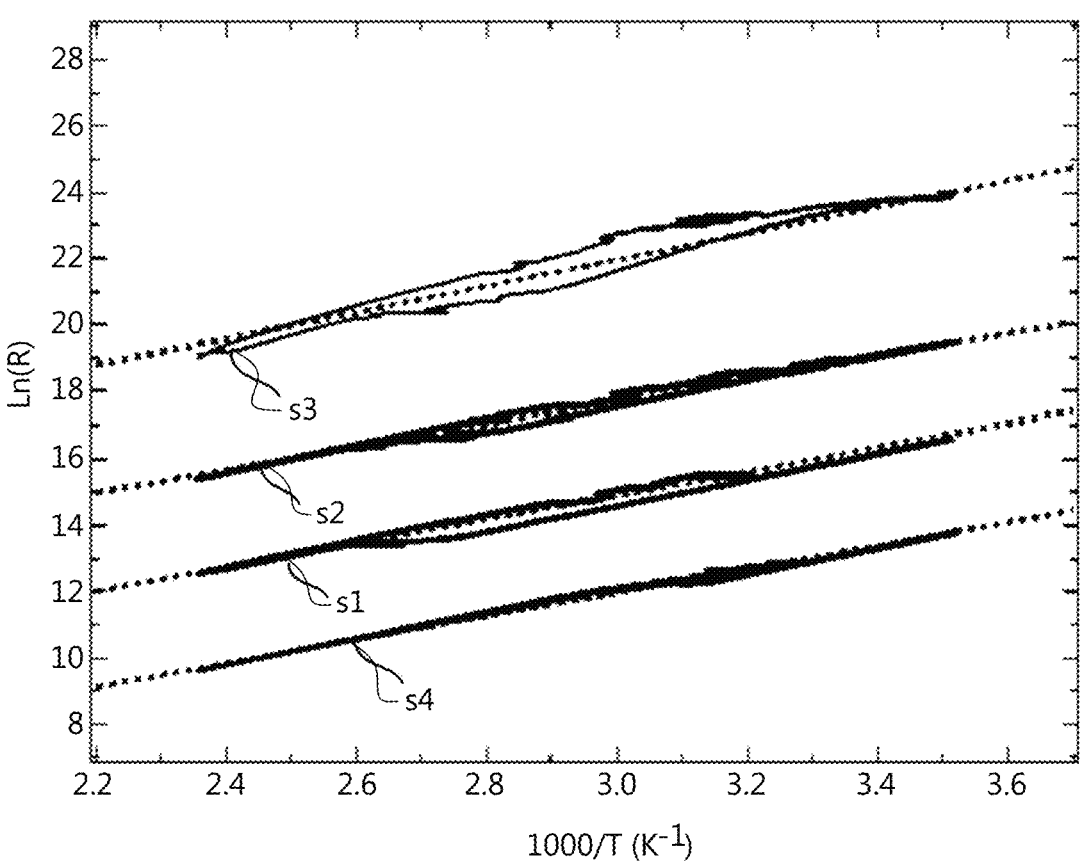
Figure 5:
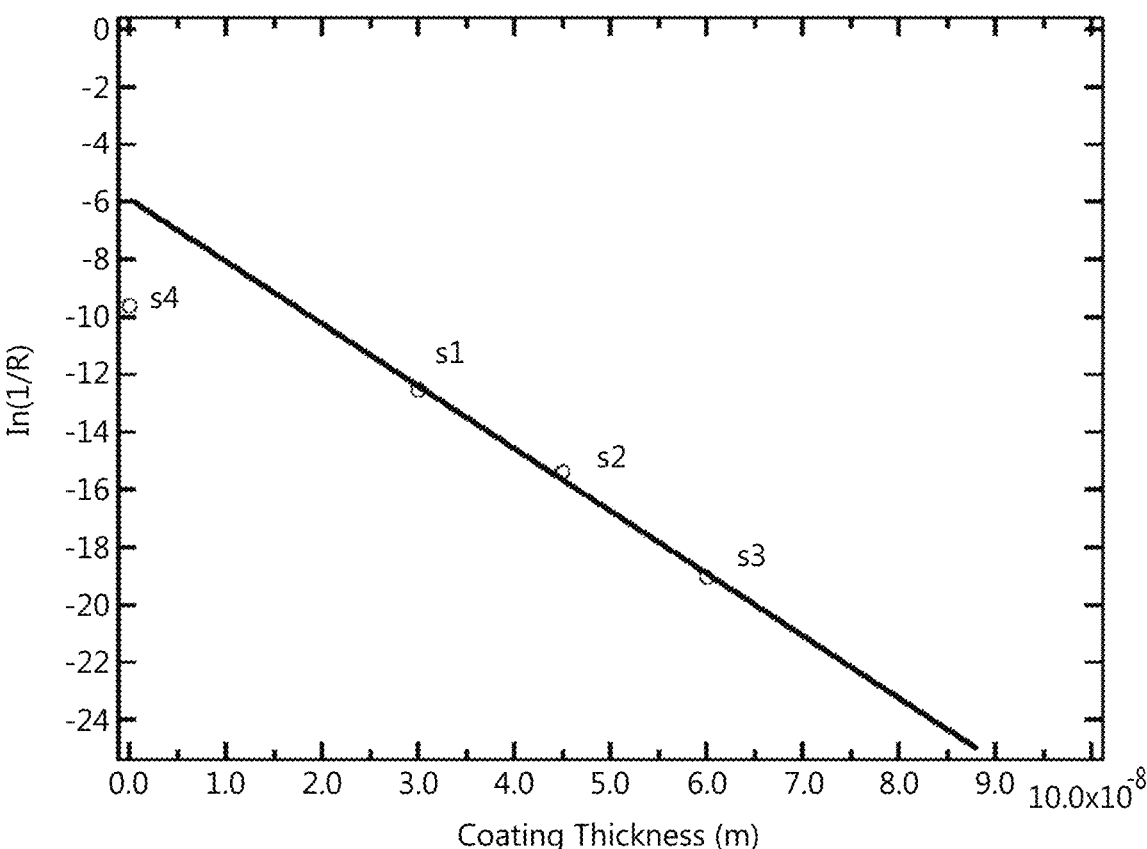
Figure 6A:
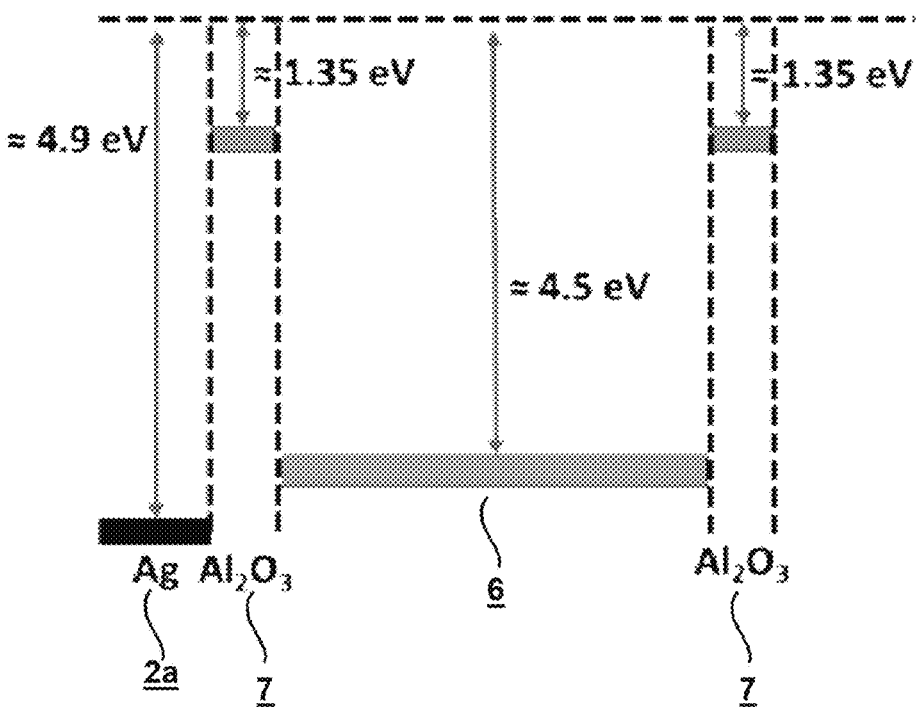
Figure 6B:
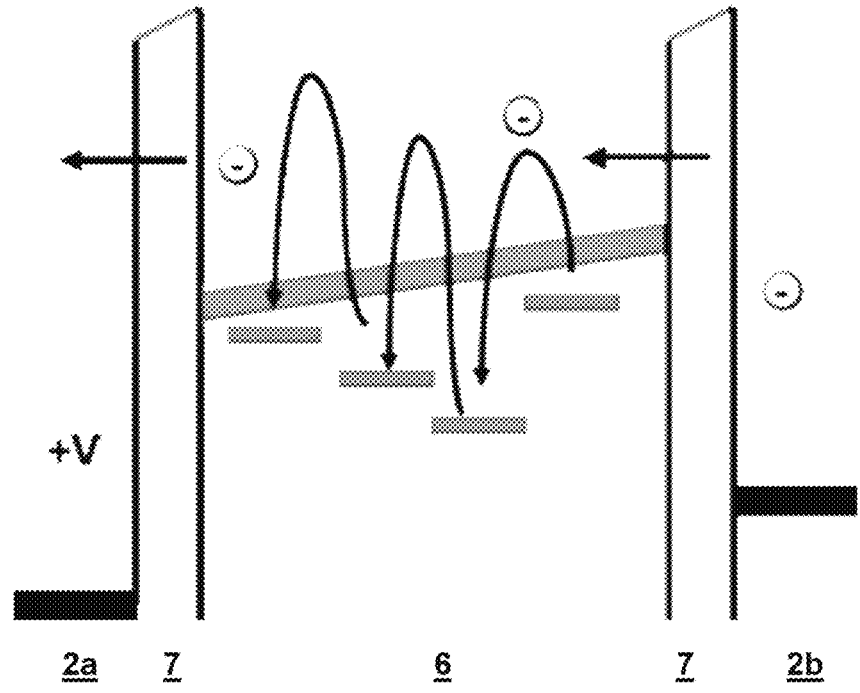

FIG. 1A schematically depicts a top-view of an embodiment of a composite thermistor element;

FIG. 1B schematically depicts a cross section side-view of an embodiment of a temperature sensor;

FIG. 2A depicts transmission electron micrographs of comparative particles;

FIG. 2B depicts transmission electron micrographs of particles according to the invention;

FIG. 3A schematically illustrates a method of manufacturing a thermistor;

FIG. 3B displays experimental results for embodiments of manufactured composite thermistor elements;

FIG. 3C compares thermosensitive behavior of thermistors;

FIG. 4 displays experimental results for embodiments of composite thermistor elements;

FIG. 5 displays experimental results for embodiments of composite thermistor elements; and FIGS. 6A and 6B illustrate aspects of operation of composite thermistor elements according to the invention.

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

In literature relating to thermistors the term 'ceramic' or 'dense ceramic' is typically used to refer to a sintered macroscopic product, e.g. an NTC active element of a sensor that formed of sintered precursor material as opposed to thermo-resistive materials formed of particles according to the present invention in which the particles can be understood to not be sintered to a single macroscopic phase. The term 'ceramics' as used herein can be understood to relate to essentially inorganic materials. Ceramics are mainly are mainly comprised of the oxides of transition elements.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1A schematically illustrates a top view of an embodiment of a thermistor element 10, e.g. for measuring temperature.

FIG. 1B schematically depicts a cross section side-view of an embodiment of a temperature sensor 50 comprising read-out electronics 40 and a thermistor element 10. Details as to the sensor and particular advantages will be explained after the detailed discussion of thermistor element and the method of manufacturing thereof.

In one embodiment, the thermistor element 10 comprises or is formed on a substrate 30. Alternatively the thermistor can be formed as a free standing product. The thermistor comprises a pair of electrodes 2a,2b. The electrodes 2a,2b are separated by an electrode gap G. A sensor material 1 is disposed between the electrodes 2a,2b to fill the electrode gap G. The sensor material 1 comprises particles 3 according to the present disclosure. The particles 3 are dispersed in a non-conducting (electrically insulating) matrix 4. The matrix has a resistance that is significantly larger, typically at least by a factor 100, or greater e.g. at least 1000, than the resistance along the pathway of contacting particles. The electrically insulating matrix 4 may function as a binder. In the embodiment shown the matrix comprises a cross-linked network of a polymer composition.

The particles 3 have a core 6 that is comprised of a semiconducting ceramic that has a temperature dependent resistance. The ceramic is typically selected in accordance with a desired temperature coefficient of resistance (B). As well known, the temperature dependent resistance can be effectively modelled or determined using the so-called B-coefficient for the Steinhart-Hart equation. Preferably the coefficient of temperature dependent resistance (B-coefficient) is in a range between 3000 and 5000 K.

Surrounding the core is a cover layer 7 of an inorganic material having a thickness 7t.

As shown the individual particles 3 contact each other to form an electrically conductive pathway 5 through the matrix 4. The contacting particle electrically connect the electrodes 2a,2b. It is believed that two distinct modes of electron (e⁻) transport contribute to conductivity along the pathway. The first mode (indicated by a dash-dot line) can be described by temperature dependent electrical conduction across the semiconductor core 6. Depending on the conductivity of the cover layer, the second mode (indicated by a dotted line 5) can be described by a resistive conductance or direct tunneling of electrons between cores of adjacent particles, i.e. across insulating cover layers bridging the shortest separation between adjacent cores.

For the NTC and PTC semiconductors cores the conduction can be described as 'polaron hoping'. Conductance across the matrix was found to be negligible. As will be described in more detail conductance through the core was found to be highly temperature dependent, whereas tunneling or resistive conductance is not, which inventors believe, to allow modulating the conductivity of the particles while leaving the temperature-dependent component unchanged.

It was found that the baseline resistance can be effectively tuned by controlling the insulating properties of the insulating cover layer Whereas NTC are believed to follow an exponential PTC-type materials are believed to follow a kind of S-curve with a switching temperature which is governed by the chemical composition of the ceramic (see FIG. 3C). For example, a change in the crystal structure at a certain temperature can results in a significant or even complete loss of conductivity. Similar to NTC materials providing the cover layer as disclosed herein can be used to modulate the base-line resistance, e.g. to modulate the switching characteristics of a PTC thermistor for overcurrent protection.

Without wishing to be bound by theory inventors find that the current passing through an insulator (insulating oxide barrier) scales either with a 'Fowler-Nordheim' type tunneling or 'direct' tunneling mechanism. For 'thicker' oxides (e.g. thickness beyond a direct tunneling regime) it is believed that the Fowler-Nordheim mechanism dominates. This mechanism is voltage (electrical field) dependent. Accordingly, current is believed to scale exponentially with oxide thickness, enabling the baseline resistance to be reliably tuned by controlling thickness of the insulating cover layer.

Of course the illustration (FIGS. 1A and 1B) is two-dimensional while in reality a three dimensional network may be formed. The present illustration schematically shows one possible path, while there may be many more paths. It will be appreciated that the present disclosure may provide a network of individual or separate (unmerged) particles which may be at close relative distance from each other and/or contacting each other, without needing to be merged together to form single piece of material, i.e. without the need for high temperature processing to sinter or melt the particles together.

It will be understood that the shape of the particles as depicted in FIG. 1A is not to be construed as limiting. It will be understood that the effect of modulating the conductivity across the particles by application of an insulating coating also applies to particles having alternate shapes and/or dimensions and in particular also to particles having an irregular shape such as particles or powders formed by crushing, milling, grinding of dense ceramics.

The electrodes are typically made of metal and may be deposited e.g. via sputtering of metals such as Al, Mo, Ag, Au, Cu. Preferably though, the electrodes are also printed, e.g. made from a silver paste or ink, or copper. For example the electrodes may have a layer thickness in a range between 0.1 to 10 μm. By forming an interdigitated finger electrode (driver) the electrode gap can relatively long transverse to the gap distance, e.g. at least ten times a minimum gap distance. This may lower the overall resistance of the thermistor.

In a preferred embodiment, the semiconducting ceramic comprises or is essentially formed of a material having a negative temperature coefficient (NTC). NTC thermistors can be of particular use in temperature sensing applications. An advantageous NTC is found in the semi conducting ceramics (metal oxides) in particular those with spinel oxide structure such as $NiMn_2O_4$, $CuFe_2O_4$, $CoMn_2O_4$, $Fe_2O_3$. Particularly suitable may be particles comprising a manganese spinel oxide. Optionally additional oxide of other elements may be included such as Cu, Fe, Co, Ni, Zn, For example manganese spinel oxide may be produced by homogenous distribution of a metal oxide precursor powder that is pressed into a pallet and calcinated, preferably above thousand degrees Celsius, e.g. 1100 degrees Celsius.

In another or further preferred embodiment, the semiconducting ceramic has a positive temperature coefficient (PTC). Devices with a PTC material display a self-limiting current at increasingly higher temperatures, which minimizes a risk of over-heating.

Providing the core with a cover layer advantageously allows selecting a semiconducting ceramic material having specific desirable B-value in a first practical operative temperature range and shifting the practical orating range to a different range at higher temperatures.

In principle the operable range can be shifted by any desirable amount by proper selection of insulator layer properties. For example, the operable range can be shifted up by about 50° C. or 100° C. or more such as by 1500 or 200° C. e.g. by controlling the thickness of the insulator layer. For example, application of the insulator layer was found to allow using particles of a ceramic having a desirable B-value in an operable range of 0-100° C., e.g. a Mn—Zn-Oxide based ceramic with a particular doping level, and using these particles to form a sensor having an operable range at temperatures between 15° and 250° C. In practice an upper operating temperature of the senor can be limited by a stability of the sensing material, e.g. a thermal decomposition temperature of the matrix material.

In a preferred embodiment, the particles have a an average maximum cross-section dimension in a range between 100 nanometers and 50 micrometers. Typically, the average maximum cross-section dimension is in a range between 1 and 45 micrometers, e.g. between 5 and 40 micrometers. Compositions of particles having an average outside said range may be increasingly more difficult to handle, e.g. due to dusting and/or due to practical limitations during deposition, e.g. screen printing, of the sensor material. Preferably, the sensor material comprises no particles with a dimension in excess of 45 micrometer.

It will be appreciated that the thickness of the cover layer is set in dependence of an intended purpose, e.g. a target baseline resistance, whereby increasingly thicker layers were found to increase the baseline resistance. Excessively thick layers may bring the resistance along the pathway 5 close the resistance of the matrix 4. Typically, the cover layer 7 has a thickness 7t in a range up to 10 nanometers or more, e.g. about 12 nm or even more, such as 15 nm. Typically, the insulator layer has a thickness of at least 1.0 nm, preferably in excess of 2.0 nanometers. In some embodiments, the thickness is in a range of 1-15 nm, preferably in a range between 2 and 15 nm, typically between 2 and 12 nm, or between 3 and 10 nm.

Alternatively, or in addition, the baseline resistance can be set by selecting the properties of the cover layer. Lower resistances requiring thicker layers to obtain a comparable resistance, and vice versa.

It will be understood that the cover layer is typically formed of a composition that is different from the composition forming core. In particular, the insulating cover layer is not to be construed as being comprised of oxides, e.g. native oxides, of the core. Instead, the cover layer is a purposefully added inorganic layer.

In one embodiment, the cover layer is formed of an electrically insulating composition. In another or further embodiment, the cover layer is formed of a semi-conducting material. In other or further embodiments, the cover layer is formed of an electrically insulating material.

In some embodiments, the cover layer comprises or essentially consists of a metal- or metalloid oxide or nitride, such as aluminum oxide, aluminum nitride, zirconium oxide, silicon oxide, titanium oxide, or mixtures thereof. Aluminum oxide, aluminum nitride, zirconium oxide, silicon oxide, titanium oxide or mixtures thereof were found to be particularly useful materials to cover the semi-conducting core in terms of stability of the layers, layer stability, and/or processability, as will be explained in more detail below.

Preferably, the inorganic material is an oxide layer. In some embodiments, the inorganic material is a dielectric material. Preferably, a dielectric material having a relative permittivity (Er) of at least 3.

Preferably, the cover layer is a high-K dielectric layer. The term high-K dielectric refers to a material with a high dielectric constant (K, kappa), as compared to silicon dioxide.

Alternatively, or in addition, the inorganic material can be characterized in having a barrier height for electron tunneling or band gap. The band gap of the layer and its alignment with that of the bulk material will govern the efficiency of their electrical contact. Furthermore, the bandgap will also govern if the outer layer is conductive or not. Typically the band gap is at least about 2.0 eV, e.g. >2.5 eV, preferably at least 3 eV. For rutile titanium oxide a band gap of 3.05 is reported (Nowotny, Janusz (2011) in Oxide Semiconductors for Solar Energy Conversion: Titanium Dioxide. CRC Press. p. 156. ISBN 9781439848395). In some embodiments, the bandgap is at least 5 eV, preferably at least 6 eV. Materials with a higher bandgap are generally more resistive and can thus impose a target baseline resistance with comparative thinner cover layers compared to more conductive materials. Silicon oxide, aluminum oxide and aluminum nitride were found to constitute materials offering a high band gap in excess of 6 eV. Generally classification of materials as metals, semiconductors and insulators is based on the band-gap theory. In metals, the valence and conduction band overlap and thus they are good conductors of heat and electricity. For semiconductors and insulators, there exists a finite gap between the valence and conduction band. The bandgap energy (ΔE) is the energy difference between the valence and the conduction band of the material (in solid state). Generally, materials are called semiconductors when $\Delta E < 3.2$ eV (at T=0 K). If $\Delta E > 3.2$ eV, then the material is typically referred to as an insulator.

Preferably, the cover layer surrounding the core has an uniform thickness. An uniform thickness can be understood as a layer having a thickness with a deviation of no more than 50% of the average layer thickness. Preferably, the deviation is less, e.g. below 20%. In absolute terms the variance of the thickness around the core is preferably no more than 3.0 nm, preferably below 2.0 nm, most preferably below 1.0 nm Alternatively, or in addition, the cover layer has essentially no gaps. More preferably the cover layer is a conformal layer. Having a layer with an uniform thickness and/or having a cover layer without gaps, reduces spread in baseline conductance across the sensing material, in particular for thermistors wherein the gap between the electrodes is or a similar order of magnitude as the average maximum cross-section dimension of the particles, i.e. wherein the conductive pathway between opposing the electrodes is formed of a limited number (N<about 20) of contacting particles, e.g. wherein a minimum distance of the electrode gap is in a range between one and ten times an average diameter of the particles.

As will be explained in more detail with reference to FIG. 3 the cover layer can be suitably provided by atomic layer deposition.

FIG. 2B depicts transmission electron micrographs of particles according to the invention having an Mn—Ni based ceramic oxide core 6 that is covered by a conformal insulator layer 7 of aluminum oxide. The cover layer is applied by atomic layer deposition. The core is provided by a particulate of a dense ceramic, e.g. a dense ceramic ground to a fine powder. As indicated the cover layer has a thickness of 6 nm. Spread was found to be well below 1 nm. FIG. 2A depicts a comparative uncoated powder, i.e. ceramic cores not having the cover layer. The scale base in each of the micrographs in FIGS. 2A and B represents 30 nm.

FIG. 3A schematically illustrates a method 100 of manufacturing a thermistor according to the invention. The method 100 comprises:

providing 101 a powder of a semiconducting ceramic having temperature dependent resistance;

coating 102 the powder with an inorganic material to form particles 3 having a core 6 comprising the semiconducting ceramic and an cover layer 7 of the inorganic material; and processing 103 a composition comprising the coated particles 3 and an electrically insulating matrix material 4 or precursor thereto so as to form a sensor material between a pair of electrodes, the sensor material comprising the particles dispersed in the matrix, wherein the particles contact each other to form an electron conducting pathway 5 between the electrodes 2a,2b.

In a preferred embodiment, the thickness of the cover layer is provided in accordance with a predetermined baseline resistance across the sensor material. Advantageously separating the steps of providing the core and providing the coating allows the thickness to be provided in accordance with a predetermined baseline resistance across the sensor material. Separating the steps of providing the core and the cover layer further allows selecting the semi-conducting core according to a desired properties, e.g. a specific coefficient of temperature dependent conductivity, without limiting the choice by requirements as to baseline resistance of the sensing material.

The powder can be provided starting from a bulk ceramic. The ceramic can be manufactured in a prior step, e.g. as a bulk ceramic, or obtained commercially, e.g. in accordance with a desired coefficient of temperature dependent resistance. The ceramic can be suitably processed to a powder, e.g. by grinding and/or milling. The dimension or size distribution of ceramic particulates forming the powder can be set by known process steps including sieving, filtering, and centrifuging. Depending on requirements as to subsequent processing steps the coated powder, i.e. the method can include filtering or sieving the coated powder (i.e. the particles), to a dimension and/or size distribution within a specific range. Accordingly, in some embodiments the method comprises one or more separating step to limit a maximum cross-section dimension of the powder, e.g. to a range between 100 nanometers and 45 micrometers. Alternatively, or in addition, the method comprises one or more separating step to limit a maximum cross-section dimension of the coated powder (the particles), e.g. to a range between 100 nanometers and 45 micrometers.

In a preferred embodiment, the step of coating the powder with an inorganic material is performed by atomic layer deposition (ALD). ALD is particularly suitable to provide conformal inorganic cover layers onto a variety of particles, including particles with rough or jagged outer surfaces, such as particles formed by milling a dense ceramic. Use of organic cover layers are less preferred. For example, organic cover layers may be less stable (less adhesive), less stable (e.g. at temperatures above 100 or 200° C.), and/or less uniform. For example, self-assembled monolayers or organic molecules bound to an outer face of a particle are known to poor be labile and less uniform, in particular at boundaries or corners between faces of irregular shaped particles. Furthermore, the quality and uniformity of the organic coverlayers can be difficult to verify.

Alternatively, other forms of layer deposition can be used such as chemical vapor deposition (CVD). Atomic layer deposition has the benefit of offering good control over layer thickness and layer composition. ALD typically comprises process cycles of alternatingly exposing a substrate to be coated, e.g. the powder, to precursors to the inorganic material. Optionally the process can include one or more cleaning, e.g. oxygen plasma exposures steps prior to, and/or in between coating cycles to clean the substrate surface and/or improve adhesion of the reagents thereto. The process cycles are repeated until the thickness of the cover layer reaches pre-determined value, e.g. for a number of cycles in accordance with a predetermined calibration.

The principles behind ALD including selection of suitable precursors for providing a coating on flat surfaces, such as wafers, are well known. For coating of a loose powder the generic principles are comparable. However, performing the cycles in a conventional reactor, e.g. a conventional vacuum chamber, is less preferable due to limited access of precursors to individual particles (along the entire perimeter) comprised in a quantity of a static powder, e.g. a layer of powder on a support tray. Performing ALD process cycles on a static power was found to yield coating layers having a comparatively layer spread in layer thickness. It was found coating uniformity can be improved by using an ALD-reactor designed for processing of powders. In a preferred embodiment, the particles are fluidized in while processing. Examples include rotary and fluidized bed reactor designs. Fluidizing the powder enables more even exposure of the powder to the precursors and was found to improve uniformity of the deposited coating. Exemplary particles as used herein have been prepared using a fluidized bed reactor as described in a publication by VALDESUERIO et al in Materials 2015, 8, 1249-126. For experimental details reference is made to a publication and the experimental section therein by GUO et al in Nanomaterials, 2018, 8(2), 61, with the note that a milled dense Mn—Zo-oxide ceramic was used as substrate. Both publications by VALDESUERIO and GUO are hereby incorporated by reference.

Processing 103 the composition so as to form a sensor material 1 between a pair of electrodes 2a, 2b, typically comprises hardening the matrix, e.g. by crosslinking and/or evaporating the solvent. It will be appreciated that this does not require melting, sintering, or otherwise merging the particles, e.g. forming a single metallurgical network, so the process can be performed at relatively low temperature. Also, it does not require any further metal (sinter) material as binder. Preferably, the sensor and substrate (if any) are processed at low temperature, e.g. below 300° C., to prevent disintegration of the matrix and/or substrate and to prevent melting, sintering, or otherwise merging the particles. For example, the hardening process is performed at an elevated temperature below 250° C. For example, the melting temperature of the particles (e.g. >500° C. or >1000° C.) can be much higher than the processing temperature (<300° C.).

In one embodiment, the sensor material has a dry layer thickness between fifteen and hundred micrometer, e.g. applied through printing. For example, the sensor material is applied using stencil printing, e.g. wherein a stencil thickness is set between 25-300 micrometers, preferably 100-150 micrometers. For example, the sensor material is applied using screen printing. e.g. wherein a screen with a mesh of mesh size less than 200 micrometers is used.

According to a further aspect the present application relates to a composition for manufacturing the sensor material of a composite thermistor element according to the present invention. The composition comprises the particles 3 as disclosed herein. The composition typically further comprises at least a solvent and an electrically insulating matrix material or precursor thereto. The composition can be manufactured by mixing the corresponding components. A preferred embodiment comprises mixing the particles with a suitable liquid carrier, e.g. a solvent, and a matrix material or precursor thereto to form an ink or paste. For example, the paste has a viscosity in a range between 10-100 Pa·s⁻¹.

The matrix preferably forms a dense structure after cross-linking. In one embodiment, the electrically insulating matrix comprises a dielectric material or otherwise electrically insulating material, e.g. a polymeric or cross-linkable material. For example, the matrix comprises a cross-linkable polymer precursor, e.g. a precursor with an acrylate, epoxy, isoprene or benzocyclobutene moiety. Alternatively, or in addition, the matrix comprises a polymer such as polyurethane ether, polyisoprene, cellulose nitrate.

In a preferred embodiment, the particles in the composition have a maximum cross-section dimension below about 45 micrometers. Limiting the maximum cross-section dimension of the particles, e.g. by sieving, can be advantageous for processability of the composition, e.g. during subsequent processing steps such as depositing the composition by screen printing.

FIG. 1B schematically depicts a cross section side-view of an embodiment of a temperature sensor 50 that comprises the composite thermistor element according to the invention. Typically the sensor 50 comprises read-out electronics 40, connected via wiring to the electrodes 2a,2b, for measuring a resistance across the thermistor 10. Alternatively the read-out may be remote or reversibly connectable to the electrodes. In a preferred embodiment, the thermistor element is provided as a thin film, e.g. having a total thickness less than 1 mm, preferably below 500 μm. The minimum thickness of the thermistor being limited by the dimension of the coated particles. In some embodiments, the film can be even thinner, e.g. below 100 μm or below 50 μm (near the maximum dimension of the particles. In some embodiments, the composite thermistor element 10 including the electrodes 2a,2b is integrally provided on a flexible substrate 30, e.g. a polymer film. As explained herein the particles and matrix can be applied to a substrate using a variety of methods, including screen printing. Providing the thermistor as a thin film, preferably a flexible film, advantageously allows measuring temperatures in confined spaces, for example in areas of machinery with limited access, such as between parts of a conveyor.

Advantageously, the thermistor according to the present invention can be manufactured with a tailored shape and dimension with relative ease. As opposed to dense ceramic thermistor elements that require separate moulds for each particular shape, thermistors according to the present invention can be conveniently manufactured to shape, e.g. by printing.

FIGS. 3B, 4, and 5 depict experimental results of thermistors according to the invention (s1-s3) and of comparative thermistors not according to the invention (s4, s5).

FIG. 3B illustrates the electrical resistance of five thermistors (s1-s5) as function of time as the thermistors are exposed to temperature in a trajectory between room temperature (about 25° C.) and 150° C. Thermistor s1 pertains to a thermistor formed with an NTC ceramic powder which is coated with a 3.0 nm layer of aluminum oxide. Thermistors s2 and s3 are similar in that the powder is formed on basis of the same ceramic powder but with an AlOx coating of respectively 4.5 and 6.0 nm (see FIG. 2B). Sample s4 is a comparative sample formed using a pristine powder (without coating). Sample s5 is a comparative commercial dense ceramic NTC thermistor.

As can be seen from FIG. 3B provision of the coating allows tuning the overall resistance across the thermistor. At t=0 (room temperature) the resistance for s4 (uncoated particles) is about $10^6$ Ohm. Provision of a 3 nm coating increases the resistance more than 10-fold. A coating of 4.5 more than 100-fold. A 6 nm coating more than 10000-fold. The effect remains as temperature increases to about 150° C. at t=60 minutes. As can be seen, provision of the coating does not significantly affect the slope of the curves, indicating that the temperature dependent resistance of the thermistor remains the same. That the dependent resistance (β) remains the same can be seen from the plot in FIG. 4, displaying the natural log of the resistance as function of one over the temperature for samples s1-s4. The dotted lines represent a linear fit. As can be seen the slope remains constant over the set of samples, only the offset is shifted as coating thickness increases.

The core is generally formed of a doped-semiconductive ceramic composition with a resistivity in a range between 1 kOhm·m and 10 MOhm·m (at 20° C.). To shift the operable temperature range the cover layer is generally configured to increase the base resistance by a factor in a range of >5 times, typically >10 times. The higher the imposed shift the more the operable temperature range can be shifted towards higher temperatures. An upper limit is generally below a factor 1000 (<1000 times). The operable temperature range can thus be extended without influencing the scaling of the semi conductive particle's conductivity with temperature.

Accordingly, in some embodiments the contribution of the cover layer to the overall electrical resistance the particles can be understood to contribute at least 10 times the temperature dependent component imposed by the core of the particles at a given temperature, e.g. at an onset of a given temperature range for NTC materials and conversely at an upper limit of an operable temperature range for PTC-based thermistors.

That the coating can be used to tune the overall resistance of the composite without significantly affecting its dependent resistance (β) is in line with the proposed mechanism of conduction through the sensor which is believed to be a superposition of electron tunneling across the insulator layer (see eq. 1) and hopping through the semi-conducting core (see eq. 2).

$$I \propto V e^{-\left(\frac{2d}{h}\right)\sqrt{2m\varphi}}, \qquad \text{(eq. 1)}$$

$$I \propto V e^{-\left(\frac{\varphi}{kT}\right)}, \qquad \text{(eq. 2)}$$

wherein I represents current, V represents potential, d represents insulator layer thickness, h represents Planck's constant over 2 pi, m represents carrier mass, φ represents the energy barrier, k represents Boltzmann's constant, and T represents temperature (in degree Kelvin).

That the baseline resistance of the composite scales exponentially with oxide thickness is evidenced by the linear fit in the plot shown in FIG. 4 depicting natural log of one over the resistance across the thermistor at a temperature of 50° C. as function of coating thickness. Note that the proposed mechanism of conduction does not apply at the point of d=zero.

FIG. 6A illustrates an energy diagram for AlOx-coated semi-conducting oxide particles between silver electrodes with indicative energy levels relative to vacuum. FIG. 6B illustrates the corresponding conductance upon application of an electric potential (V) by electron tunneling across the AlOx barrier 7 and hopping across the semi-conducting core 6.

For the purpose of clarity and a concise description, features are described herein as part of the same or separate embodiments, however, it will be appreciated that the scope of the invention may include embodiments having combinations of all or some of the features described.

For example, while embodiments were shown for Mn—Zn oxide based NTC particles, also alternative ways may be envisaged by those skilled in the art having the benefit of the present disclosure for achieving a similar function and result. The various elements of the embodiments as discussed and shown offer certain advantages, such as tuning of overall resistance of temperature sensors. Of course, it is to be appreciated that any one of the above embodiments or processes may be combined with one or more other embodiments or processes to provide even further improvements in finding and matching designs and advantages.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A composite thermistor element comprising:
a sensor material disposed between a pair of electrodes,
wherein the sensor material comprises particles dispersed in a matrix, the particles contacting each other to form an electron conducting pathway between the electrodes, and
wherein the particles have:
a core comprising a semiconducting ceramic material having temperature dependent resistance with a material specific temperature coefficient of resistance, and
an insulating cover layer of an inorganic material having a thickness and resistivity in accordance with a predetermined baseline resistance component of an overall electrical resistance across the sensor material along the pathway between the electrodes, the overall resistance further including a temperature dependent component imposed by the core of the particles.

2. The composite thermistor element according to claim 1, wherein the inorganic material has a bandgap larger than 3.2 eV.

3. The composite thermistor element according to claim 1, wherein the cover layer has a thickness in a range enabling electron tunneling between cores of contacting ones of the particles.

4. The composite thermistor element according to claim 1, wherein the cover layer has a thickness in a range of 1-10 nanometers.

5. The composite thermistor element according to claim 1, wherein the cover layer comprises one or more of the group consisting of: aluminum oxide, aluminum nitride, zirconium oxide, silicon oxide, and mixtures thereof.

6. The composite thermistor element according to claim 1, wherein the cover layer surrounding the core has a uniform thickness.

7. The composite thermistor element according to claim 1, wherein the particles have a maximum cross-section dimension in a range between 100 nanometers and 45 micrometers.

8. A composition for manufacturing the sensor material of a composite thermistor element according to claim 1, wherein the composition comprises:
a matrix material or precursor thereto, and
particles having:
a core comprising a semiconducting ceramic material having temperature dependent resistance, and
an insulating cover layer of an inorganic material,
wherein the cover layer has a thickness and resistivity within a range enabling electron tunneling between cores of contacting ones of the particles.

9. The composition according to claim 8, wherein the composition is mixed with a suitable liquid carrier and wherein the particles have a maximum cross-section dimension in a range between 100 nanometers and 45 micrometers.

10. A temperature sensor comprising read-out electronics and the thermistor element according to claim 1.

11. The temperature sensor according to claim 10, wherein the thermistor element is integrally provided on a flexible polymer film.

12. A method of manufacturing a composite thermistor element comprising:
providing a powder of a semiconducting ceramic having temperature dependent resistance;
coating the powder with an inorganic material to form particles having:
a core comprising the semiconducting ceramic material, and
an insulating cover layer of the inorganic material; and
processing the composition to form a sensor material between a pair of electrodes, the sensor material comprising the particles dispersed in the matrix,
wherein ones of the particles contact each other to form an electron conducting pathway between the electrodes, and
wherein the thickness and resistivity of the cover layer is provided in accordance with a predetermined baseline resistance component of an overall electrical resistance across the sensor material, said overall resistance further including a temperature dependent component imposed by the core of the particles.

13. The method according to claim 12, wherein the coating the powder with an inorganic material includes an atomic layer deposition process.

14. The method according to claim 13, wherein the atomic layer deposition process comprises fluidizing the powder in the process flow.

15. The method according to claim 14, wherein the processing is performed at a temperature below 300° C.

* * * * *